J. C. FORSTER.
HOUSEHOLD TOOL.
APPLICATION FILED JULY 12, 1912.
1,083,078.
Patented Dec. 30, 1913.
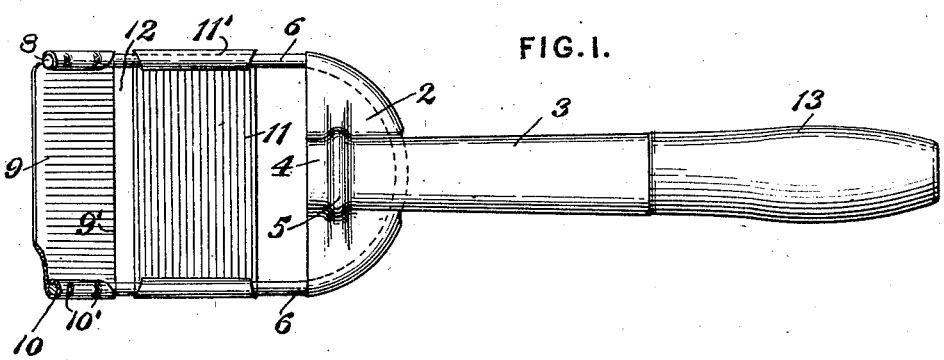
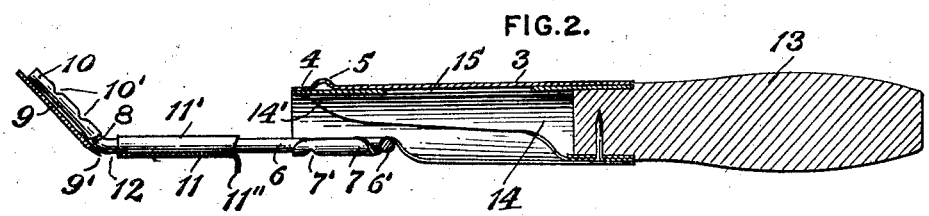
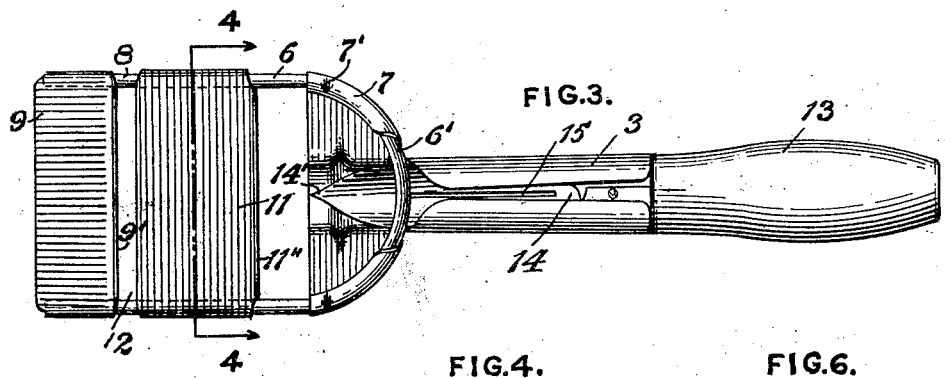
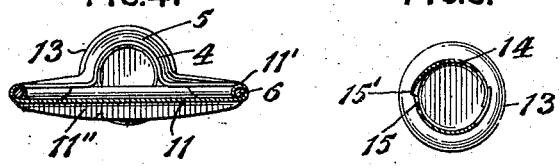
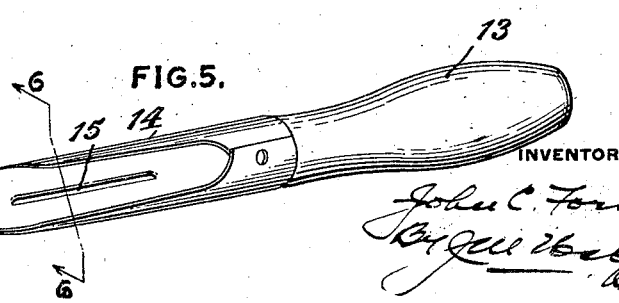

UNITED STATES PATENT OFFICE.

JOHN C. FORSTER, OF PITTSBURGH, PENNSYLVANIA.

HOUSEHOLD TOOL.

1,083,078.   Specification of Letters Patent.   Patented Dec. 30, 1913.

Application filed July 12, 1912. Serial No. 709,092.

*To all whom it may concern:*

Be it known that I, JOHN C. FORSTER, a resident of Pittsburgh, in the county of Allegheny and State of Pennsylvania, have invented certain new and useful Improvements in Household Tools, of which the following is a specification.

The object of this invention is to provide an efficient and inexpensive household tool that may be variously used in the preparation of vegetables and fruit, as will hereinafter appear.

In the accompanying drawings, Figure 1 is a top plan of the improved tool, and Fig. 2 is a central longitudinal section of the same. Fig. 3 is an inverted plan. Fig. 4 is a cross-section on line 4—4 of Fig. 3. Fig. 5 is a detail of the detachable handle-forming element, and Fig. 6 is a cross section of the blade of the handle element taken on line 6—6 of Fig. 5.

Referring to the drawings, the shank of the tool is formed of sheet-metal and consists of the widened front portion 2 with the metal at the rear thereof curled or bent to form the open-end socket 3, the curvature of this socket forming part being extended across the widened front 2 to provide the central arch 4 which strengthens said portion, and also provides space for the blade element of the removable handle-forming device. Arch 4 is beaded transversely at 5, and as the bead extends beyond the arch at either side the arched and widened portion of the shank is materially strengthened.

Projecting from the front of the shank are the parallel arms 6 which are formed preferably of a single piece of wire which is curved or bent for placing arms 6 in parallel relation. The curved portion 6' of the wire is seated on the under face of widened portion 2 of the sheet-metal shank, and the edges of the latter are curled around the wire as indicated at 7 with the curled portions indented at 7', thereby rigidly and permanently fastening together the wire and shank. The outer extremities 8 of arms 6 are bent at an angle as shown, and secured thereto is blade 9 with cutting edge 9' disposed downwardly and inwardly toward the shank. The blade is preferably fastened to the arms by curling its extremities 10 around the same and indenting the curled portions, as indicated at 10'. A gage plate 11 has its edges 11' curled around arms 6 and is slidable thereon for varying the width of space 12 separating the guide plate and blade, thereby determining the thickness of slices of fruit, vegetables, etc., cut by the blade. The rear edge of plate 11 may be bent at 11'' to provide a finger-hold for sliding the same.

Socket 3 preferably comprises only a portion of the handle, the remainder thereof consisting of the handle or handhold 13 of a coring tool, 14 being the curved sheet-metal blade of said tool which is pointed as usual at 14' to facilitate the coring operation. A longitudinal slot 15 may be formed in blade 14 with the edge thereof deflected at 15' Fig. 6, for paring potatoes, apples, etc. No novelty is claimed herein for the coring tool *per se*.

The blade of the coring tool is adapted to be entered in socket 3 and the resiliency of the sheet-metal blade and socket serves to frictionally hold the parts together and provide an efficient handle for the tool. But when the corer is to be used alone it may be readily withdrawn from the socket.

The tool may be conveniently used for slicing potatoes, cabbage, and vegetables and fruits of various kinds, the cutting being done by a scraping or pulling action of the tool over the surface being cut, the width of slot 12 determined by gage 11 controlling the thickness of the cut, the cut or sliced portion passing upwardly through the slot as will be understood.

I claim:—

1. A household tool comprising a sheet-metal shank having a widened front portion and a rearwardly extending handle portion, a single piece of wire doubled upon itself by means of a curved bend to provide projecting arms which extend forwardly from the widened front portion of the shank, cutting means carried by the arms, the metal of the widened shank at opposite sides of the handle portion thereof curled around the curved bend in the wire thereby giving the widened shank portion the curvature of the wire, said curved and curled portions extending from the front edge of the widened portion backwardly and inwardly to the handle portion, said widened shank portion being arched centrally of its length to approximately conform to the handle portion, the portion intermediate the arch and the curled portions approximating the top plane of the curved portion of the wire, whereby the curvature of the wire and the relatively flat portions of the widened shank coöperate to prevent distortion of the tool, the space between the arch portion and the wire being adapted to receive a detachable tool, said portion and wire acting as protectors for the tool.

2. In a household tool, cutting means, a movable guide member, a support therefor, said support comprising a single piece of wire bent to form a frame having parallel arms connected at the front by said cutting means and at the rear by a curved portion integral therewith, said arms extending tangential to the curved portion and forming guiding supports for the guide member, and a sheet-metal shank having a handle portion expanded laterally at its front to form a widened portion, the outer edges of which curl about the curved portion of the frame, said widened portion being arched centrally with portions between the arch and the curled edges substantially flat and approximating the plane of said curved wire portion, the widened portion and the curved wire portion coöperating to connect the handle portion to the frame in a manner to mutually brace the parts and prevent relative longitudinal movement therebetween.

In testimony whereof I affix my signature in presence of two witnesses.

JOHN C. FORSTER.

Witnesses:
J. M. NESBIT,
F. E. GAITHER.